UNITED STATES PATENT OFFICE.

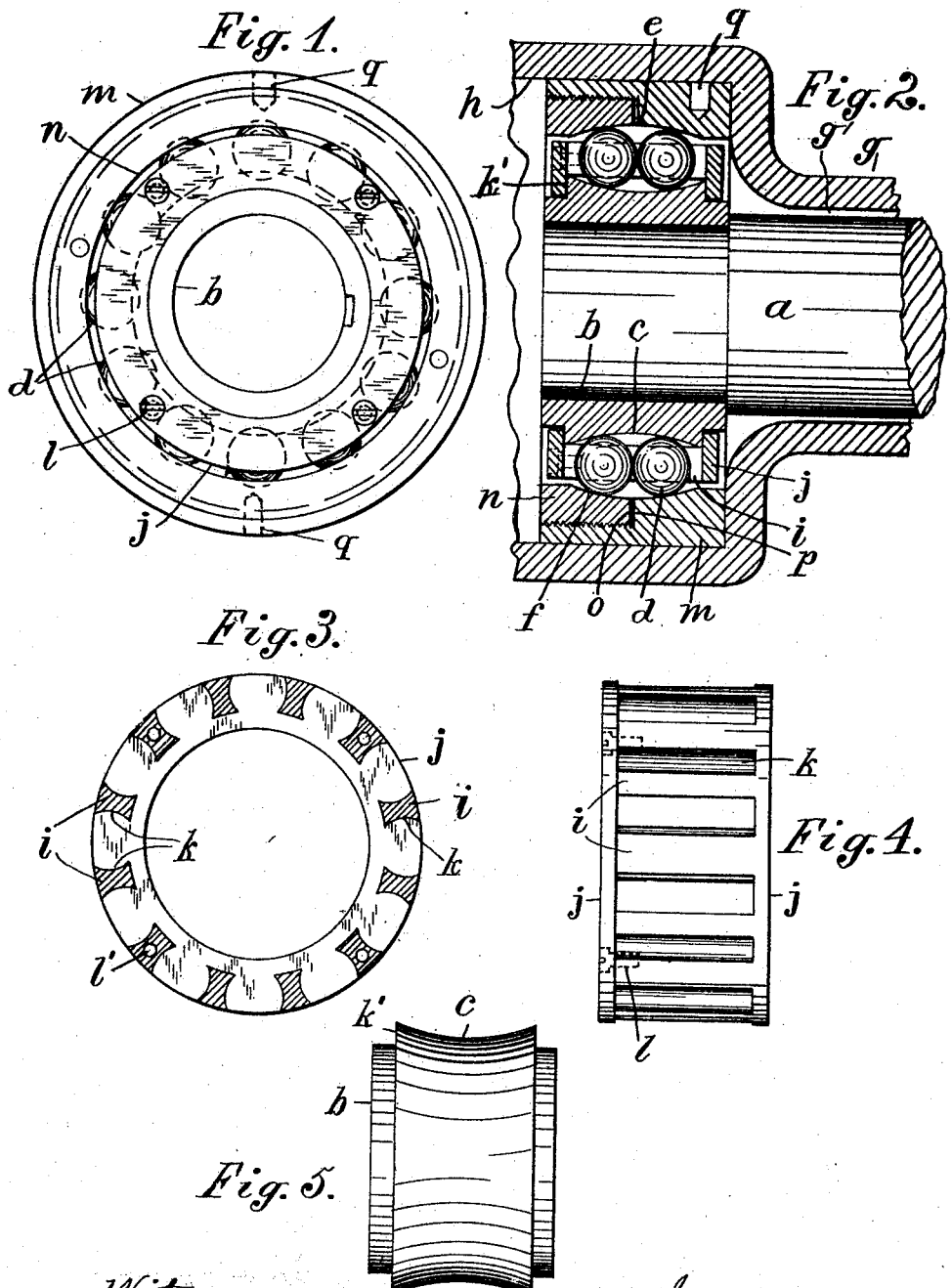

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

BALL-BEARING WITH SELF-ADJUSTING CASING.

976,477.  Specification of Letters Patent.  Patented Nov. 22, 1910.

Application filed October 9, 1909. Serial No. 521,857.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Ball-Bearings with Self-Adjusting Casings, fully described and represented in the following specification and the accompanying drawings, forming a part of the same.

This invention relates to a ball-bearing in which the casing has a spherical bore so that the balls may change their path of movement within the casing and thus automatically adapt themselves to changes in the inclination of the shaft. In this class of bearing, the balls have heretofore been guided upon the inner bearing-ring or hub by a groove in the hub, but such groove not made with opposed sloping seats adapted to support two series of balls in the same groove. In my construction, I employ two series of balls, in contact with one another on the diametrical line of the spherical casing, and thus contacting with the bore of the casing at opposite sides of such diametrical line, where the spherical surface forms two annular seats inclined toward one another so as to crowd the two series of balls together. To retain the balls in their paths upon the reversely inclined seats of the casing, I form the hub also with similarly inclined seats and apply the two series of balls to the opposed seats. The reversely inclined seats upon the hub or inner bearing-ring are readily formed by a concave groove, which is preferably of the same cross section as the bore, that is, with a radius corresponding to the radius of such bore, the centers of both curves lying in the same plane so that they form inclined bearing-seats similarly opposed to one another. The angles of the reversely inclined seats upon the hub are not material, as the two series of balls, supported upon a hub having reversely inclined seats, are adapted to travel continuously around the hub in contact with one another, provided they are held by suitable means in corresponding adjacent positions. Such means is provided in a cage having slots adapted to hold the balls of both series in pairs and the balls of each pair in lateral contact. As the balls in both series may be made of the same diameter and the seats which support them also of equal diameter, they produce no friction whatever where they revolve in contact with one another and their surfaces do not, therefore, abrade one another. The cage may also assist in retaining the balls upon the hub when applying the casing thereto, by making the bars of the cage concave to fit the sides of the balls and making one end of the cage removable from the bars to permit the insertion of the pairs of balls between the bars.

In the annexed drawing, Figure 1 is an end view of the bearing; Fig. 2 is a longitudinal section where hatched of the same bearing inclosed in a socket upon an axle-tube; Fig. 3 is a cross section of the cage; Fig. 4 is an elevation of the cage, and Fig. 5 an elevation of the hub.

The shaft inserted in the bearing is designated $a$ with the hub $b$ secured thereon and formed with a concave seat $c$ which receives two parallel contiguous series of balls $d$ embraced by a casing which has a spherical seat $e$, and the seat $c$ upon the hub is made, in cross section, of the same curvature as the casing, thus making opposed sloping ball-seats.

The balls in the two series touch the hub and casing a sufficient distance from the diametral line of the spherical seat to press upon the surface where it is somewhat inclined, as at $f$ in Fig. 2, and the balls are thus adapted to resist end-thrust in opposite directions.

The axle-tube $g$ is shown clear of the axle at $g'$ and formed with a socket $h$ to receive the casing $e$, the clearance between the axle and the axle-tube permitting the axle to tip slightly within the same, thus throwing the balls into a different line of contact with the casing.

The spherical surface of the casing maintains a perfectly equal bearing upon the rolls whether the axle be tipped in one direction or the other. The balls being of the same size in the two series are readily guided by parallel guide-bars $i$, which are connected by heads $j$ and are formed with concave sides $k$ loosely fitting the balls.

The heads $j$ are fitted to turn in contact with shoulders $k$ formed upon the hub near its opposite ends, and one of the heads $j$ is removable as shown at the left side of Fig. 4, and secured to the ends of the guide-bars by screws $l$ fitted to holes $l'$ in the bars.

The removable head upon the cage permits the cage to be fitted to the opposite ends of the hub and to the balls when placed upon the seat c. With a spherical casing, the parts of the bearing could not be assembled unless the hub or casing were divided transversely, and the casing is therefore shown with a body-portion m having a threaded recess extended into one end of the same, and a separable ring-portion n screwed into the same against a packing o upon a seat p in such body-portion. A change in the thickness of the packing permits a slight adjustment of the two parts of the casing toward one another to compensate for wear of the balls, the variation in the spherical contour being too slight to be material, in making such a change.

The corresponding positions of the balls in the two series is essential, in order that each ball in one series may, when longitudinal thrust is applied by the movement of the hub, convey the thrust by central contact to a ball in the adjoining series, which in turn transmits the thrust to the inclined wall of the spherical casing which supports it. The end-thrust is thus conveyed through the balls wholly by their lateral contact, and such lateral contact, and the corresponding positions which preserve such contact, are readily maintained by any cage which holds the rolls of the two series in separate pairs.

This construction forms a ball-bearing with few parts and having a self-adjusting character capable of adapting itself automatically to the variations of direction in which the pressure is imposed upon it by a jarring load, such as is operative upon the axle of an automobile. In such constructions, the frame and parts supported thereby are forced to yield in various directions, and the present construction wholly avoids any unequal bearing of the hub upon the supporting balls, by permitting them to change their relation to the spherical casing.

Having thus set forth the nature of the invention what is claimed herein is:

1. In a roller bearing, the combination, with a casing having a spherical bore, of a hub having a grooved seat thereon and two contiguous series of balls fitted to such seat and to the spherical bore of the casing, and means for holding each ball of one series in lateral contact with a ball of the adjacent series in their revolutions upon the hub.

2. In a roller bearing, the combination, with a casing having a spherical bore, of an inner bearing-ring having a concave groove, the centers of curvature of the groove and the casing being in the same plane, two series of balls fitted between the casing and inner bearing-ring in lateral contact, and means for holding the balls in pairs contiguous to one another in their movement within the casing.

3. In a roller bearing, the combination, with a casing having a spherical bore forming two ball-seats sloped toward one another, of an inner bearing-ring having a concave groove forming two ball-seats sloped toward one another and opposed to the seats in the casing, two series of balls fitted to the said seats in contact with one another, and means for holding the balls in corresponding positions contiguous to one another, the opposed seats operating to hold the two series of balls in contact with one another when in operation, and to thus transmit end thrust without friction from one series of balls to the other.

4. In a roller bearing, the combination, with a casing having a spherical bore, of a hub having shoulders at its ends and a concave seat thereon with two series of balls fitted to such seat and to the spherical bore of the casing in contact with one another at opposite sides of a diameter of the casing, and a cage having guide-bars between each ball of each series, said guide-bars concaved upon their sides to hold the balls upon the hub, and the heads of the cage being fitted to the shoulders upon the hub to guide it in its movement with the balls.

5. In a roller bearing, the combination, with two contiguous series of balls and a hub and casing having concave seats to resist end thrust, of a cage having annular heads, and guide-bars with concave sides to hold the balls in place upon the hub, and one of the heads being secured detachably to the guide-bars for inserting two balls in each space between the guide-bars.

6. In a roller bearing, the combination, with a casing having a spherical bore, of a hub having a seat concaved in cross section with the same curvature as the casing, two series of balls fitted to such hub and casing at opposite sides of a diameter of the casing, and a cage separating the balls of both series into pairs, with the balls having lateral contact in each pair.

In testimony whereof I have hereunto set my hand in the presence of two subscribing witnesses.

CHARLES S. LOCKWOOD.

Witnesses:
L. LEE,
THOMAS S. CRANE.